US008429746B2

(12) United States Patent
Capalik

(10) Patent No.: US 8,429,746 B2
(45) Date of Patent: Apr. 23, 2013

(54) DECOY NETWORK TECHNOLOGY WITH AUTOMATIC SIGNATURE GENERATION FOR INTRUSION DETECTION AND INTRUSION PREVENTION SYSTEMS

(75) Inventor: Alen Capalik, Los Angeles, CA (US)

(73) Assignee: NeuralIQ, Inc., Santa Monica, CA (US)

( * ) Notice: Subject to any disclaimer, the term of this patent is extended or adjusted under 35 U.S.C. 154(b) by 1323 days.

(21) Appl. No.: 11/488,743

(22) Filed: Jul. 17, 2006

(65) Prior Publication Data
US 2007/0271614 A1 Nov. 22, 2007

Related U.S. Application Data

(60) Provisional application No. 60/802,543, filed on May 22, 2006.

(51) Int. Cl.
*G06F 21/00* (2006.01)
(52) U.S. Cl.
USPC ...... 726/23; 726/4; 726/24; 726/22; 713/164; 713/188; 380/201; 455/410; 705/905
(58) Field of Classification Search ............... 726/22, 726/24, 23
See application file for complete search history.

(56) References Cited

U.S. PATENT DOCUMENTS

| 5,339,426 | A | * | 8/1994 | Aoshima ........................... 713/1 |
| 5,664,159 | A | | 9/1997 | Richter et al. |
| 6,009,274 | A | * | 12/1999 | Fletcher et al. ............... 717/173 |
| 6,279,113 | B1 | * | 8/2001 | Vaidya ............................. 726/23 |
| 6,360,327 | B1 | * | 3/2002 | Hobson ......................... 713/300 |
| 7,222,366 | B2 | * | 5/2007 | Bruton et al. .................. 726/23 |
| 7,392,543 | B2 | * | 6/2008 | Szor ................................. 726/23 |
| 7,464,407 | B2 | * | 12/2008 | Nakae et al. .................... 726/22 |
| 2002/0099752 | A1 | | 7/2002 | Markos et al. .................... 709/1 |
| 2002/0166063 | A1 | * | 11/2002 | Lachman et al. ............. 713/200 |
| 2003/0120935 | A1 | * | 6/2003 | Teal et al. ...................... 713/188 |

(Continued)

FOREIGN PATENT DOCUMENTS
WO WO 2006/113781 A1 10/2006

OTHER PUBLICATIONS

Shibuya et al, JP article, "A study for some experiences of the Operation of Highly Interactive Decoy System", Transactions of the Information Processing Society of Japan, vol. 45, No. 8, pp. 1921-1930, Publication Date: Aug. 2004.*

(Continued)

*Primary Examiner* — Morshed Mehedi
(74) *Attorney, Agent, or Firm* — Morgan, Lewis & Bockius LLP

(57) ABSTRACT

Improved methods and systems for decoy networks with automatic signature generation for intrusion detection and intrusion prevention systems. A modular decoy network with front-end monitor/intercept module(s) with a processing back-end that is separate from the protected network. The front-end presents a standard fully functional operating system that is a decoy so that the instigator of an attack is lead to believe a connection has been made to the protected network. The front-end includes a hidden sentinel kernal driver that monitors connections to the system and captures attack-identifying information. The captured information is sent to the processing module for report generation, data analysis and generation of an attack signature. The generated attack signature can then be applied to the library of signatures of the intrusion detection system or intrusion prevention system of the protected network to defend against network based attacks including zero-day attacks.

22 Claims, 4 Drawing Sheets

U.S. PATENT DOCUMENTS

| | | | | |
|---|---|---|---|---|
| 2004/0225877 | A1* | 11/2004 | Huang | 713/100 |
| 2006/0018466 | A1 | 1/2006 | Adelstein et al. | |
| 2006/0031673 | A1* | 2/2006 | Beck et al. | 713/164 |
| 2006/0136720 | A1* | 6/2006 | Armstrong et al. | 713/164 |
| 2006/0242703 | A1* | 10/2006 | Abeni | 726/23 |
| 2006/0288414 | A1* | 12/2006 | Kuroda | 726/24 |
| 2006/0294592 | A1* | 12/2006 | Polyakov et al. | 726/24 |
| 2007/0002689 | A1 | 1/2007 | Mateescu et al. | 367/73 |

OTHER PUBLICATIONS

European Network of Affined Honeypots, "D1.2: Attack Detection and Signature Generation", fp6-noah.org, May 11, 2006.*

Liang et al. "Fast and Automated Generation of Attack Signatures: A Basis for Building Self-Protecting Servers", Proceedings of the 12th ACM conference on Computer, CCS'05, Nov. 7-11, 2005, Alexandria, Virginia, USA.* http://en.wikipedia.org/wiki/Honeypot;, Jul. 17, 2006.

http://en.wikipedia.org/wiki/Intrusion_detection_system, Jul. 17, 2006.

Asrigo et al., "Using VMM-Based Sensors to Monitor Honeypots," Department of Electrical and Computer Engineering, VEE'06, Jun. 14-16, 2006, pp. 13-23.

Debug Register, "Aus Lowlevel," Mar. 22, 2010, 5 pgs.

Joshi et al., "Detecting Past and Present Intrusions Through Vulnerability-Specific Predicates," Department of Electrical Engineering and Computer Science, SOSP'05, Oct. 23-26, 2005, 14 pgs.

Krapf et al., "XEN Memory Management (Intel IA-32)," Oct. 30, 2007, 6 pgs.

Litty et al., "Hypervisor Support for Identifying Covertly Executing Binaries," SS'08 Proceedings of the 17th Conference on Security Symposium, Dec. 31, 2008, 1-16 pgs.

Provos, "A Virtual Honeypot Framework," Oct. 21, 2003, 11pgs.

Neuraliq, Inc., PCT/US2011/041122, Jun. 20, 2011, International Search Report and Written Opinion mailed Sep. 21, 2011, 14 pgs.

Neuraliq, Inc., PCT/US2011/041119, Jun. 20, 2011, International Search Report and Written Opinion mailed Oct. 4, 2011, 14 pgs.

Office Action for U.S. Appl. No. 11/788,795 dated Jun. 9, 2010, 13 pgs.

Final Office Action for U.S. Appl. No. 11/788,795 dated Dec. 1, 2010, 18 pgs.

Examiner's Answer for U.S. Appl. No. 11/788,795 dated May 31, 2011, 19 pgs.

International Search Report for International Application No. PCT/US08/60336, mailed Aug. 11, 2008 (related case).

* cited by examiner

Figure 3

When first run W32/Rbot-CBQ copies itself to <System>\msprexe.exe.  ← 300

The following registry entries are created to run msprexe.exe on startup:

HKCU\Software\Microsoft\Windows\CurrentVersion\Run  ← 301
Windows Management System
msprexe.exe HKLM\SOFTWARE\Microsoft\Windows\CurrentVersion\Run  ← 302
Windows Management System
msprexe.exe HKLM\SOFTWARE\Microsoft\Windows\CurrentVersion\RunServices
Windows Management System
msprexe.exe Registry entries are set as follows:

HKLM\SOFTWARE\Microsoft\Ole
EnableDCOM
N

HKLM\SYSTEM\CurrentControlSet\Control\Lsa
restrictanonymous
1

Figure 4

```xml
<item type="STRING.TCP">              ← 400
  <struct name="STRING.TCP">
    <var name="version" protected="true">4.0</var>
    <array name="signatures">
      <entry dontDelete="true" nda="false" sfr="85">
        <var name="SigName" default="RBOT.CBQ Worm Activity" protected="true" />
        <var name="SIGID" default="5571" protected="true" />
        <var name="SubSig" default="0" protected="true" />
        <var name="AlarmSeverity" default="high" />
        <var name="Enabled" default="True" />
        <var name="EventAction" default="alarm">alarm|reset</var>
        <var name="SigVersion" default="S185" />
        <var name="SigStringInfo" default="RBOT.CBQ" />
        <var name="AlarmThrottle" default="Summarize" />
        <var name="Direction" protected="true" default="ToService" />
        <var name="MinHits" default="1" />
        <var name="Protocol" default="TCP" />
        <var name="RegexString" protected="true"
default="\xb5\x71\xc4\x43\x1e\x34\xce\x3a\x18\x37\xef\xc3\x22\xa1\x20\x1f\x6c\x10\x8f\x68\x3d\xf4\xef\x51\x92\xf9\x4f\xbc\x46\xe9\x05\xdc" />
        <var name="ServicePorts" default="445" />
        <var name="StorageKey" default="STREAM" />
        <var name="SummaryKey" default="Axxx" />
        <var name="ThrottleInterval" default="15" />
      </entry>
    </array>
  </struct>
</item>
```

DECOY NETWORK TECHNOLOGY WITH AUTOMATIC SIGNATURE GENERATION FOR INTRUSION DETECTION AND INTRUSION PREVENTION SYSTEMS

This application claims benefit from U.S. Provisional Patent Application Ser. No. 60/802,543 filed May. 22, 2006 the specification of which is hereby incorporated herein by reference.

BACKGROUND OF THE INVENTION

1. Field of the Invention

The invention relates to the field of methods and systems for protecting computer networks and is more particularly, but not by way of limitation, directed to decoy network technology with automatic signature generation for intrusion detection and intrusion prevention systems.

2. Description of the Related Art

Computer networks typically interface with the Internet or other public computer systems and are thus vulnerable to attacks, unwanted intrusions and unauthorized access. One threat to networks is the so-called zero-day attack that exploits security vulnerabilities unknown to the system operators.

Conventional network security systems include a firewall that generally prevents unauthorized access to the network or its computers. Conventional systems also include intrusion detection systems (IDS) and intrusion prevention systems (IPS) that typically contain a library of signatures of malware payloads, which enable them to detect those defined exploits attempting to access production systems. When a connection is attempted to a network port, the IDS or IPS examines the low-level IP data packets and compares them to its library of signatures for a match. When a match is identified the IDS or IPS provides notification of the match.

The problem lies in the static nature of the conventional IDS and IPS signatures coupled with the ability of determined attackers to launch new undefined or zero-day automated attacks to gain access to the network. While an intrusion prevention system (IPS) equipped with behavioral signatures providing the ability to capture behavioral patterns offers a higher level of protection, these have similar drawbacks in that behavioral signatures are still static in nature and limited in their ability to stop zero-day attacks.

Still another type of network security systems utilizes a honeynet arrangement to attract and then trap a suspected attacker. A honeynet is made up of two or more honeypots on a network. Such measures typically are made up of a computer, data or network site that appears to be part of the network and appears to be one or more valuable targets, but which is actually an isolated component located away from production networks. These are typically passive measures effective against spammers and other low-level attacks. Such systems typically run emulated operating systems and services and are generally not useful against sophisticated attackers who can detect and effectively avoid the honeynet, never unloading their zero-day attack or payload for the honeynet to capture and analyze. Also, if the conventional honeynet configuration is not sufficiently separated from the network system, an attacker can use the honeynet to gain access to the network. Examples of emulated or software based honeypots include "honeyd" which is a GPL licensed daemon that is utilized to simulate network structures. Another example of emulated software based honeypots include "mwcollect" and "nepenthes" which are also released under the GPL license and which are utilized to collect malware. The "mwcollect" and "nepenthes" packages extract information on obtaining the malware binaries from the exploit payload.

Because each of the problems and limitations discussed above exist in the prior art devices and systems, there is a need for methods and systems that adequately protect networks from new and undefined attacks and that allow for real-time updates to a network's library of attack signatures.

BRIEF SUMMARY OF THE INVENTION

One or more embodiments of the invention are directed to an improved method and system for protecting computer networks. In one embodiment, the invention comprises a modular decoy network appliance, which runs fully functional operating systems on client hardware modules. The modular arrangement comprises front-end fully functional operating system modules and a separate processing back-end module.

The front-end presents a standard fully functional operating system, such as Windows® or a flavor of Linux®, or Sun Microsystems Solaris® that returns a standard operating system fingerprint when it is scanned by tools that attackers typically use to identify vulnerable systems. The attacker is thus lured into accessing the identified operating system and running custom or known exploits on that system.

The front-end module includes a sentinel kernal driver (or a more generalized executable module) that is hidden from system scanners as it is removed from kernal module listings or registry in Windows. Thus, the kernal does not indicate the sentinel kernal driver is running. The sentinel kernal driver monitors connections to the operating system as well as activity on the operating system and activity on services running on the operating system. When an attacker connects to a port, the sentinel kernal driver captures the data coming through the socket. Generally all relevant data coming through the socket is captured. In most cases this means whatever data is received as part of an incoming attack is captured by the sentinel driver. Captured data is sent as a slew of common UDP packets to the back end processing module over the fabric network connection separate from the vulnerable front-end modules. In this manner, there is no way for the intruder to know that his or her communications with the operating system are being analyzed.

The captured data, which constitutes the attack identifying information, is sent to the back-end or processing module though the backplane fabric of the appliance using layer 2 ethernet communication protocol. The processing module is separate and independent from the client operating system modules and communicates the processed information to security administrators through a network port connected to the private and secure VLAN. Unbeknownst to the intruder, the exploit is thus captured, transferred and analyzed.

With the received data, the processing module generates a report of the attack. The report consists of user-friendly information that paints a picture of the attack for a system administrator. This may include information on which sockets were accessed, what happened at a particular socket, the key strokes entered or bytes transferred to the port, what files were transferred, registry changes, how the attack was run, what happened on the primary network, on its servers or how the network services were affected. The report may also include information on the location of the attacker or the attacker's service provider. Graphical representations of key information and interactive mapping of the attack locales by region or country may be utilized in one or more embodiments of the invention.

The processing module is used to generate an attack signature by analyzing all the data passed through the socket. The signature is generated by analyzing the attack payload including the keystrokes or transferred bytes and any files uploaded to the client operating system of an ASCII or binary nature. The files uploaded are assumed to be of a malicious nature created to deliver a malicious payload in the form of a compiled program or an interpreted script. In the event that no malicious files are uploaded to the operating system, the signature generation engine analyzes all the keystrokes or bytes delivered through the socket and creates a pattern signature which when applied to an IDS or IPS system, enables the IDS or IPS systems to detect the attack if repeated on production systems. Once generated, the attack signatures can be viewed by a system administrator to determine the appropriate course of action. The system administrator can instruct the signature to be uploaded to the intrusion detection system (IDS) or intrusion prevention system (IPS) for the protected network where it is added to the IDS's or IPS's library of signatures to protect production systems. In one or more embodiments of the invention, the signature may be uploaded or saved in a third party system that maintains all known exploits. In this manner, other systems may be notified through secure channels of an impending threat. For example, by transferring the signature to a centralized server that communicates with multiple installations, the intruder may be thwarted before attacking other systems in other companies.

A production network's library of signatures can be updated in real-time as the attacker modifies its illicit activity or a new attack is launched. The embodiment can also maintain a database of any and all attack signatures generated. Other and further advantages will be disclosed and identified in the description and claims and will be apparent to persons skilled in the art.

DESCRIPTION OF THE DRAWINGS

FIG. 3 illustrates a human readable summary of an example attack.

FIG. 4 illustrates an XML formatted attack signature generated from the attack summarized in FIG. 3 for transmittal to an IDS or IPS.

DETAILED DESCRIPTION OF THE PREFERRED EMBODIMENT

The following descriptions of embodiments of the invention are exemplary, rather than limiting, and many variations and modifications are within the scope and spirit of the invention. Although numerous specific details are set forth in order to provide a thorough understanding of the present invention, it will be apparent to one of ordinary skill in the art, that embodiments of the invention may be practiced without these specific details. In other instances, well-known features have not been described in detail in order to avoid unnecessarily obscuring the present invention.

Figure 1:
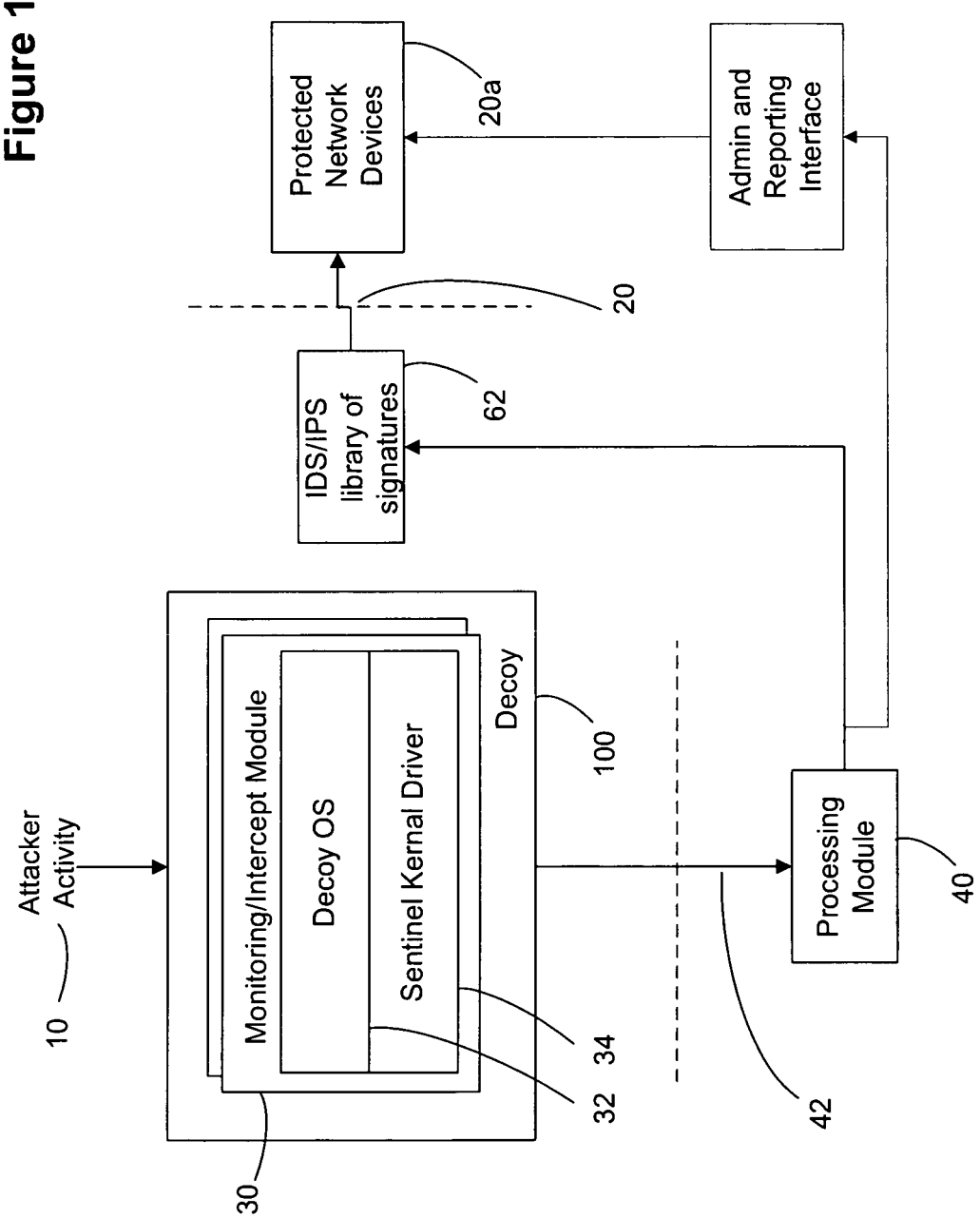
FIG. 1 illustrates a block diagram of an embodiment of the system.

One or more embodiments of the invention are directed to an improved method and system for protecting computer networks. One embodiment is illustrated in FIG. 1, which illustrates attacker activity 10 directed at protected computer network 20. As in a typical attack, attack 10 is scanning for an open port on computer network 20 in an attempt to make a connection and then access one or more protected network devices 20a on network 20.

Attack 10 is monitored by decoy 100 that includes at least one monitor/intercept module 30. Monitor/intercept module 30 comprises fully functioning decoy operating system 32 that monitors each of the access ports for network 20. Any operating system may be used as decoy operating system 32 including Windows®, Sun Microsystems Solaris® or any version of Linux® known to persons skilled in the art. All known operating systems are within the scope of the present invention. FIG. 1 shows one monitoring/intercept module 30 in the foreground, however any number of homogeneous or heterogeneous monitoring/intercept modules may be utilized (shown as a stack behind monitor/intercept module 30). For example, in one embodiment of the invention a Windows® monitoring/intercept module 30 and LINUX® monitoring/intercept module 30 may be employed. There is no limit to the number of monitoring/intercept modules that may be utilized in the system and other embodiments may employ homogeneous decoy operating systems 32 that are of the same or of different versions. Monitoring/intercept module 30 also includes sentinel kernal driver 34 which will be described in further detail below. Protected network devices 20a are accessed through IDS/IPS with Library of Signatures 62 in one or more embodiments of the invention. The system also includes processing module 40 for obtaining and analyzing exploits.

When attack 10 connects to an access port of network 20, the fully functional decoy operating system 32 intercepts the connection and returns a standard operating system fingerprint. For example when connecting to an address that does not exist on protected network 20, decoy 30 may be configured to respond to any such incorrect address since the connection is assumed to be malicious as there is no hardware on protected network 20 at that address. The response may be configured to utilize any existing hardware module having a given operating system and version within monitoring/intercept module 30. For example, an FTP port access for Windows® may return a particular character sequence that is different than an FTP response for LINUX®. An FTP access to a Windows® port for example may return a response ">ftp: connect: Connection refused". This characters sequence may be slightly different on LINUX® and hence allows the intruder to determine what type of operating system is at a particular network address. In addition, different versions of Windows® may respond with slightly different character sequences which allows the intruder to determine the specific version of the operating system or to determine a possible range of versions for the responding operating system. The instigator of attack 10 is thus lured into accessing decoy 100, which includes monitor/intercept module 30, and running custom or known exploits for the observed operating system. When attacker activity proceeds to interact with decoy 100, the attacker provides decoy 100 with the data used to obtain control of decoy 100, which is recorded and analyzed without knowledge of the attacker.

All scans by attack 10 receive real-world operating system information, thus leading the instigator of the attack 10 to believe that there is a potentially vulnerable system responding and thus luring attack 10 into communicating with monitor/intercept module 30. Since real hardware is utilized, the attacker is attacking an actual physical system and thus has no idea that the system is actually an instrumented honeypot that monitors the attackers every move.

Monitor/intercept module 30 includes sentinel kernal driver 34. In one embodiment, sentinel kernal driver 34 is a combination of custom root-kit code that on Windows® based operating systems removes pointers from Microsoft® client/server runtime server subsystem (CSRSS.exe). This coupled with removing sentinel kernal driver 34 from the Windows® registry effectively hides sentinel kernal driver 34 and all its drivers from attack 10. On Unix® based operating systems, the kernal pointers are removed making the kernal unable to link to a running process, effectively hiding sentinel kernal driver 34 and all its libraries from attack 10. Sentinel kernal driver 34 monitors all data coming through the socket and is derived from an open source code, such as libpcap, known to persons skilled in the art.

When an attacker connects to a port, and begins interacting with decoy operating system 32, sentinel 34 monitors and captures information from the connection including port numbers, data streams, keystrokes, file uploads and any other data transfers.

The captured information, or attack identifying information, is then sent for processing to processing module 40 as illustrated in FIG. 1. Processing module 40 may optionally include a sentinel server that receives information from the sentinel kernal driver and deposits the information in a database for later analysis. In one embodiment, the monitor/intercept module 30 is a front-end module or series of modules and the captured data is sent to processing module 40 though the backplane of the appliance or appliances through a layer 2 ethernet communications link not available to the attacker such as an IP connection or any other hardware dependent custom communication protocol known to persons skilled in the art. Processing module 40 is part of a secure and separate administrative network 42. In one or more embodiments the signature may be sent from the back end processing module 40 to IDS/IPS 62 through a second network connection which is used by the processing module 40 to directly interact with IDS/IPS 62. The sentinel kernal driver may utilize replay functionality to replay the attacks on the operating system in reverse to clean up the operating system to its pre-attack state. In this manner, the attack can be thwarted and the operating system thus does not become a tool of the hacker.

Figure 2:
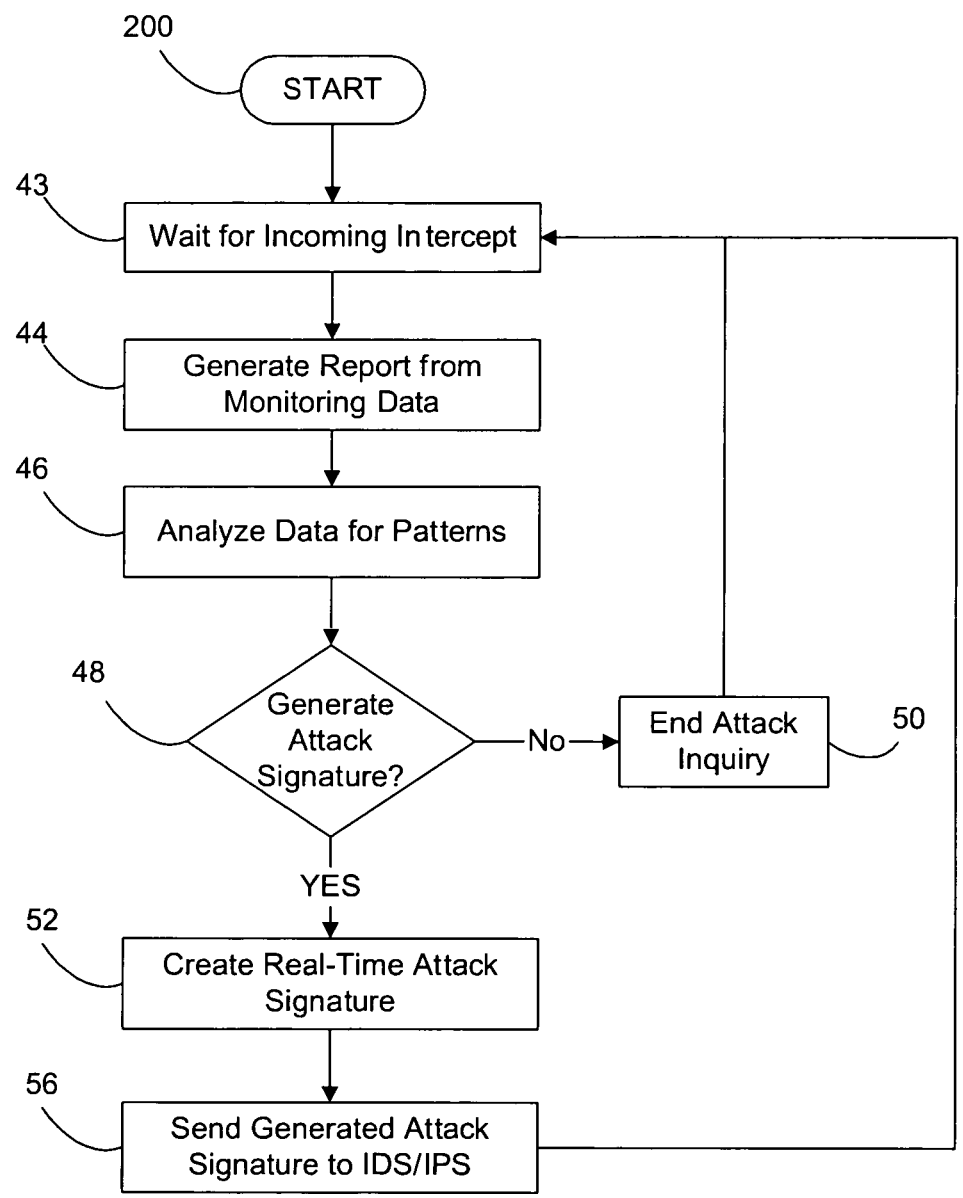
FIG. 2 illustrates a flow chart of an embodiment of the processing that occurs on processing module 40.

As shown in FIG. 2, processing starts at 200 and waits for activity from sentinel kernal driver 34 at step 43. In step 44, processing module 40 generates a report of the attack that includes attack-identifying information (See FIG. 3). This report is for the use and review by a system administrator who is responsible for administering protected network 20. The attack may contain one or more data transfers or keystrokes for example, which are analyzed at step 46. By observing whether the attacker is successful in interacting with the system, i.e., if the system is responding in a manner that shows that the attacker has gained access, then determination whether to generate an attack signature is made at step 48 and the attack signature is generated at step 52 (See FIG. 4). If the attacker for example is unsuccessful at gaining access or if there is no data transfer for example, then the attack inquiry may be ended at step 50. Any generated attack signature is sent to the IDS/IPS at step 56 and processing continues at step 43.

In one embodiment of the invention, the report is written, and is displayed in an AJAX based WebUI and can include information about which sockets were accessed by attack 10, what happened at a particular socket, the key strokes entered or data transferred, what files were transferred, how the attack 10 was run, what happened on monitor/intercept module 30 and how decoy operating system 32 and any related network services were affected. The report may also include information on the location of the instigator of attack 10 or the service provider used for attack 10. Graphical representations of key information and interactive mapping of attack locales by region or country may also be included in the report.

In step 46, the attack identifying information is analyzed for known attack patterns and non-standard patterns such as repeating binary patterns, keystroke patterns, downloaded daemons or errors such as buffer overflow attempts. By observing the operations performed on decoy operating system 32 the attack may be categorized and analyzed to determine for example how an attack gains control of decoy operating system 32. Any method of analyzing the incoming data such as binary matching, neural network matching or keyword matching or any other method of matching attack-identifying information is in keeping with the spirit of the invention.

In step 48, a decision is made as to whether to generate an attack signature. If no harmful operations occurred as a result of attack 10 or when no known attack patterns are found, then no further attack inquiry would be needed as shown in step 50. The processing module 40 can then take on the next input of captured information from the monitor/intercept module 30.

If a determination is made that attack signature generation is warranted, an attack signature is generated as illustrated in step 52. Processing module 40 may generate a signature whenever data is found to be transferred through the socket in one or more embodiments of the invention. Alternatively, if the attack signature already exists or if the data transfer is of a nature that indicates probing rather than attack, then the attack signature may not be generated. For example, processing module 40 may not generate a signature when it is found that no data has been transferred through the socket even though the socket may have been opened and closed without data transfer. Once the attack signature is generated, the signature can be reviewed by the system administrator who decides to send the attack signature, shown in step 56, to the intrusion detection system (IDS) or intrusion prevention system (IPS) for the protected network 20 through a standard network connection including a wireless connection that is generally not sent on protected network 20 or any other network that the attacker may observe. This is accomplished by applying the generated attack signature to the IDS/IPS library of signatures to update the information contained in the library of signatures to prevent the attacker from accessing the primary network with a zero-day attack.

Embodiments of step 56 may save the generated attack signatures in a database for future use or further analysis by system administrators. The signatures may also be sent to a proprietary global database of attack signatures for further analysis. Any IDS/IPS may be utilized in one or more embodiments of the invention. Existing IDS/IPS systems for example may be interfaced with in order to integrate with existing solutions.

FIG. 3 illustrates a human readable summary of an example attack. Line 300 shows that the file "msprexe.exe" is copied into the "System" directory. Line 301 shows a first registry entry created by the attack. Line 302 shows a second registry entry created by the attack. Any other changes to the system may be shown, as part of the attack identifying information and the information shown in FIG. 3 is exemplary only.

FIG. 4 illustrates an XML formatted attack signature generated from the attack summarized in FIG. 3 for transmittal to an IDS or IPS. XML block 400 includes tags that define the attack signature in the format of the particular IDS or IPS. Any tags used by any IDS or IPS are in keeping with the spirit of the invention and the tags shown in FIG. 4 are exemplary only. For example any ports, protocols, severity levels, alarm levels, signature name or any other quantity may be utilized to inform an IDS or IPS of an attack signature.

While embodiments and alternatives have been disclosed and discussed, the invention herein is not limited to the particular disclosed embodiments or alternatives but encompasses the full breadth and scope of the invention including equivalents, and the invention is not limited except as set forth in and encompassed by the full breadth and scope of the claims herein:

What is claimed is:

1. A method for protecting a primary computer network with automatic signature generation for intrusion detection and intrusion prevention systems, comprising:
   providing a decoy network connection on a primary computer network to a decoy that includes a decoy operating system comprising a functional operating system hosted on a monitoring/intercept module that includes a kernel driver coupled with said functional operating system and hidden from an attacker by removing one or more pointers to the kernel driver, wherein the kernel driver is hidden from the attacker by preventing the kernel driver from registering with the decoy operating system;
   intercepting a network attack on said primary computer network using the monitoring/intercept module of the decoy, wherein said network attack comprises attack-identifying information that is based on all activities associated with the decoy operating system, where all activities associated with the decoy operating system are assumed to be unauthorized;
   processing said attack-identifying information using a processing module connected to the decoy through a second secure computer network to identify said network attack and generate an attack signature, wherein the second secure computer network is distinct from the primary computer network; and
   applying said attack signature to a library of signatures contained in an intrusion detection system or intrusion prevention system to control access to said primary computer network.

2. The method of claim 1 further comprising:
   providing a second decoy network connection on said primary computer network to a second decoy operating system wherein said decoy operating system and said second decoy operating system are different operating systems and wherein said second decoy operating system comprises a second functional operating system hosted on a second monitoring/intercept module.

3. The method of claim 1 wherein said attack signature is generated based on an attack payload including keystrokes or ASCII or binary files.

4. The method of claim 1 wherein the attack signature is generated if an attacker communicates with a port.

5. The method of claim 1 wherein said attack signature is generated if an attacker is able to successfully gain access to said decoy operating system.

6. The method of claim 1, further comprising providing a report of said network attack to an administrator.

7. The method of claim 1 wherein said attack signature is maintained in a database.

8. A system for a protecting a primary computer network with automatic signature generation for intrusion detection and intrusion prevention systems, comprising:
   a decoy hosted on a primary computer network, wherein said decoy is configured to provide a decoy operating system over a decoy network connection and wherein said decoy operating system comprises a functional operating system hosted on a monitoring/intercept module;
   a kernel driver coupled with said functional operating system and hidden from an attacker by removing one or more pointers to the kernel driver, wherein the monitoring/intercept module including said kernel driver is configured to intercept a network attack on said primary computer network, and said network attack comprises attack-identifying information that is based on all activities associated with the decoy operating system, where all activities associated with the decoy operating system are assumed to be unauthorized, wherein the kernel driver is hidden from the attacker by preventing the kernel driver from registering with the decoy operating system;
   a processing module comprising a processor device wherein said processing module is connected to the decoy through a second secure computer network, and wherein said processing module is configured to identify said network attack and generate an attack signature from said attack-identifying information, wherein the second secure computer network is distinct from the primary computer network; and
   said processing module further configured to apply said attack signature to a library of signatures contained in an intrusion detection system or intrusion prevention system to control access to said primary computer network.

9. The system of claim 8 further comprising:
   a second decoy including a second decoy operating system on said primary computer network, wherein said decoy operating and said second decoy operating system are different operating systems, and said second decoy operating system comprises a second functional operating system hosted on a second monitoring/intercept module.

10. The system of claim 8, wherein said attack signature is generated based on an attack payload including keystrokes of ASCII or binary filed.

11. The system of claim 8 wherein said attack signatures are maintained in a database.

12. The system of claim 8 where the primary network comprises one or more protected network devices comprising at least one server.

13. The system of claim 8 where said attack signature is automatically generated based on said attack-identifying information.

14. A system for protecting a primary computer network having a library of signatures comprising:
   means for providing a decoy network connection on a primary computer network to a decoy that includes a decoy operating system comprising a functional operating system hosted on a monitoring/intercept module that includes a kernel driver coupled with said functional operating system and hidden from an attacker by removing one or more pointers to the kernel driver, wherein the kernel driver is hidden from the attacker by preventing the kernel driver from registering with the decoy operating system;
   means for intercepting a network attack on said primary computer network using the monitoring/intercept module of the decoy, wherein said network attack comprises attack-identifying information that is based on all activities associated with the decoy operating system, where all activities associated with the decoy operating system are assumed to be unauthorized;
   means for processing said attack-identifying information using a processing module connected to the decoy through a second secure computer network to identify said network attack and generate an attack signature, wherein the second secure computer network is distinct from the primary computer network; and means for applying said attack signature to a library of signatures contained in an intrusion detection system or intrusion prevention system to control access to said primary computer network.

15. The system of claim 14, further comprising:

means for providing a second decoy network connection on said primary computer network to a second decoy operating system wherein said decoy operating system and said second decoy operating system are different operating systems and wherein said second decoy operating system comprises a second functional operating system hosted on a second monitoring/intercept module.

16. The system of claim 14 wherein said attack signature is generated based on an attack payload including keystrokes or ASCII or binary files.

17. The system of claim 14 wherein said attack signature is maintained in a database.

18. The system of claim 14 wherein said attack signature is generated if an attacker communicates with a port.

19. The system of claim 14 wherein said attack signature is generated if an attacker is able to successfully gain access to said decoy operating system.

20. The system of claim 14, further comprising means for providing a report of said network attack to an administrator.

21. The method of claim 1, wherein the all activities on the decoy operating system include: connections to the decoy operating system, activity on the decoy operating system, and activity on services running on the decoy operating system.

22. The method of claim 1, wherein the second secure computer network comprises a layer 2 communications link not available to the attacker.

* * * * *